United States Patent
Wang et al.

(10) Patent No.: US 8,870,985 B2
(45) Date of Patent: Oct. 28, 2014

(54) ABRASIVE PARTICLE AND METHOD OF FORMING SAME

(75) Inventors: Jianna Wang, Grafton, MA (US); Guan Wang, Worcester, MA (US); Charles G. Herbert, Shrewsbury, MA (US)

(73) Assignees: Saint-Gobain Abrasives, Inc., Worcester, MA (US); Saint-Gobain Abrasifs, Conflans-Sainte-Honorine (FR)

( * ) Notice: Subject to any disclaimer, the term of this patent is extended or adjusted under 35 U.S.C. 154(b) by 383 days.

(21) Appl. No.: 13/340,234

(22) Filed: Dec. 29, 2011

(65) Prior Publication Data

US 2012/0167477 A1   Jul. 5, 2012

Related U.S. Application Data

(60) Provisional application No. 61/428,268, filed on Dec. 30, 2010.

(51) Int. Cl.
*B24D 3/00*   (2006.01)
*C09K 3/14*   (2006.01)

(52) U.S. Cl.
CPC ............... *C09K 3/1409* (2013.01); *B24D 3/00* (2013.01)
USPC ............................................. 51/307; 51/295

(58) Field of Classification Search
CPC ...... C09K 3/1436; C09K 3/1409; C09K 3/14; C04B 35/00; B24D 3/28; B01J 2/006; C01P 2004/62
See application file for complete search history.

(56) References Cited

U.S. PATENT DOCUMENTS

| | | | |
|---|---|---|---|
| 426,994 A | 4/1890 | Halsey | |
| 441,041 A | 11/1890 | Sorel | |
| 1,118,822 A | 11/1914 | Spero | |
| 2,001,911 A | 5/1935 | Wooddell et al. | |
| 2,009,222 A | 7/1935 | Connor | |
| 2,115,897 A | 5/1938 | Wooddell et al. | |
| 2,378,630 A | 6/1945 | Hill | |
| 2,539,107 A | 1/1951 | Sectish | |
| 2,542,058 A | 2/1951 | Riedesel | |
| 2,986,455 A | 5/1961 | Sandmeyer | |
| 3,427,765 A | 2/1969 | McGarvey | |
| 3,645,050 A | 2/1972 | Croll et al. | |
| 3,653,859 A | 4/1972 | Zimmer, Jr. et al. | |
| 3,701,703 A | 10/1972 | Zimmer, Jr. et al. | |
| 3,928,949 A * | 12/1975 | Wagner | 451/533 |
| 4,086,067 A | 4/1978 | Busch et al. | |
| 4,629,473 A | 12/1986 | Ruid et al. | |
| 4,954,140 A * | 9/1990 | Kawashima et al. | 51/295 |

(Continued)

FOREIGN PATENT DOCUMENTS

JP    S57127664 A    8/1982
JP    2004338064 A   12/2004

OTHER PUBLICATIONS

PCT/US2011/067898, International Search Report mailed Aug. 24, 2012, 1 page.

*Primary Examiner* — Pegah Parvini
(74) *Attorney, Agent, or Firm* — Joseph P. Sullivan; Abel Law Group, LLP

(57) ABSTRACT

An abrasive article comprising an abrasive particle including a core comprising a compressible material, an intermediate layer comprising a binder material overlying an exterior surface of the core, and an outer layer comprising abrasive grains overlying the intermediate layer.

20 Claims, 6 Drawing Sheets

(56) References Cited

U.S. PATENT DOCUMENTS

| | | | |
|---|---|---|---|
| 5,024,680 A * | 6/1991 | Chen et al. | 51/295 |
| 5,039,311 A * | 8/1991 | Bloecher | 51/295 |
| 5,609,656 A | 3/1997 | Hanson | |
| 5,672,185 A | 9/1997 | Ryoke | |
| 5,989,114 A | 11/1999 | Donahue et al. | |
| 6,866,793 B2 * | 3/2005 | Singh | 252/79.1 |
| 6,939,211 B2 * | 9/2005 | Taylor et al. | 451/60 |
| 7,214,126 B1 | 5/2007 | Kamei | |
| 7,435,276 B2 * | 10/2008 | Chen et al. | 51/307 |
| 2003/0182867 A1 | 10/2003 | Son | |
| 2006/0154582 A1 | 7/2006 | Hope | |
| 2008/0155904 A1 | 7/2008 | Peterson et al. | |
| 2008/0258331 A1 | 10/2008 | Le Normand et al. | |
| 2010/0040832 A1 | 2/2010 | Herbert | |
| 2010/0122498 A1 | 5/2010 | Chen | |

\* cited by examiner

ABRASIVE PARTICLE AND METHOD OF FORMING SAME

CROSS-REFERENCE TO RELATED APPLICATION(S)

The present application claims priority from U.S. Provisional Patent Application No. 61/428,268, filed Dec. 30, 2010, entitled "ABRASIVE PARTICLE AND METHOD OF FORMING SAME," naming inventors Jianna Wang, Guan Wang, and Charles G. Herbert, which application is incorporated by reference herein in its entirety.

BACKGROUND

1. Field of the Disclosure

The following is directed to abrasive particles, and particularly, a composite abrasive particle including cork.

2. Description of the Related Art

Abrasive articles, such as coated abrasives and bonded abrasives, are used in various industries to machine workpieces, such as by lapping, grinding, or polishing. Machining utilizing abrasive articles spans a wide industrial scope from optics industries, automotive paint repair industries, to metal fabrication industries. In each of these examples, manufacturing facilities use abrasives to remove bulk material or affect surface characteristics of products.

Surface characteristics include shine, texture, and uniformity. For example, manufacturers of metal components use abrasive articles to finish and polish surfaces, and oftentimes desire a uniformly smooth surface. Similarly, optics manufacturers desire abrasive articles that produce defect-free surfaces to prevent light diffraction and scattering.

Manufactures also desire abrasive articles that have a high stock removal rate for certain applications. However, there is often a trade-off between removal rate and surface quality. Finer grain abrasive articles typically produce smoother surfaces, yet have lower stock removal rates. Lower stock removal rates lead to slower production and increased cost.

Certain commercially available abrasives have a tendency to leave random surface defects, such as scratches that are deeper than the average stock removal scratches. Such scratches may be caused by grains that detach from the abrasive article, causing rolling indentations. When present, these scratches scatter light, reducing optical clarity in lenses or producing haze or a foggy finish in decorative metal works. Such scratches also provide nucleation points or attachment points that reduce the release characteristics of a surface.

Particulate abrasive materials can include single phase inorganic materials, such as alumina, silicon carbide, silica, ceria, and harder, high performance superabrasive grains such as cubic boron nitride and diamond. Additionally, industries have developed composite particulate materials, such as aggregates, which can be formed through slurry processing pathways that include removal of the liquid carrier through volatilization or evaporation, leaving behind green agglomerates, followed by high temperature treatment (i.e., firing) to form usable, fired agglomerates.

Still, the industry continues to demand even further improved particulate materials, and particularly, composite aggregates that may offer enhanced machining performance.

SUMMARY

According to one aspect, an abrasive article includes a composite abrasive particle including, a core comprising a compressible material, and a shell layer overlying the exterior surface of the core, the shell layer having an intermediate layer overlying an exterior surface of the core, and an outer layer comprising abrasive grains overlying the intermediate layer, the intermediate layer having a thickness less than the outer layer.

In another aspect, an abrasive article includes an abrasive particle having a core comprising cork, an intermediate layer comprising a binder material overlying an exterior surface of the core, and an outer layer comprising abrasive grains overlying the intermediate layer.

In yet another aspect, an abrasive article includes a composite abrasive particle including a core and a shell layer overlying the core, wherein the core comprises a compressible material and the shell layer comprises an intermediate layer overlying the core and an outer layer overlying the intermediate layer. The abrasive particle has a shell layer ratio (Wi:Wo) of at least about 1:1, wherein Wi is the weight percent of the intermediate layer for the entire weight of the abrasive particle and Wo is the weight percent of the outer layer for the entire weight of the abrasive particle.

According to another aspect, an abrasive article includes an abrasive particle having a core comprising cork and a shell layer overlying the core comprising abrasive grains bonded to a binder material. The binder material has a material selected from the group consisting of phenolic resin, urea formaldehyde, urethanes, epoxies, polyimides, polyamides, polyester, acrylates, polyvinyls, protein-based materials, starch-based materials, and a combination thereof.

In another aspect, an abrasive article includes a coated abrasive article having a backing and a composite abrasive particle bonded to the backing, wherein the composite abrasive particle includes a core comprising cork, an intermediate layer comprising a binder material overlying an exterior surface of the core, and an outer layer comprising abrasive grains overlying the intermediate layer.

According to one particular aspect, an abrasive article includes a coated abrasive article including a backing, a composite abrasive particle bonded to the backing, wherein the composite abrasive particle includes a core comprising cork and a shell layer overlying the core, and a size coat overlying the composite abrasive particles and the backing.

One aspect includes a method of forming a composite abrasive particle comprising forming a mixture comprising cork particles and a binder material, adding abrasive grains to mixture to coat the cork particles, and drying the mixture to form composite particles comprising a core including the cork particles, an intermediate layer overlying an exterior surface of the core, and an outer layer overlying the intermediate layer.

In still another aspect, a method of forming a composite abrasive particle includes forming a mixture comprising cork particles, a binder material, and abrasive grains, wherein the mixture comprises a ratio (Wi:Wo) of at least about 1:1. Wi is the weight percent of the binder material for an entire weight of the mixture and Wo is the weight percent of the abrasive grains for the entire weight of the mixture. The method further includes drying the mixture to form composite particles comprising a core including the cork particles, and a shell layer overlying the core comprising the binder material and the abrasive grains.

In still another aspect, a method of forming a coated abrasive article includes providing a backing, placing composite abrasive particles on the backing, the composite abrasive grains comprising a core including cork and a shell layer comprising abrasive grain overlying the core, and forming a size coat on the composite abrasive particles and the backing.

In yet another aspect, an abrasive article includes a backing and a composite abrasive particle bonded to the backing, wherein the composite abrasive particle includes a core comprising a compressible material and a shell layer overlying the core.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

The following is directed to abrasive particles, more particularly, composite abrasive particles and abrasive articles utilizing the composite abrasive particles. The composite abrasive particles can include multiple components, which may be present generally in the form of a core/shell construction. Furthermore, the following is directed to abrasive articles, particularly coated abrasive articles including single layered abrasive articles utilizing the abrasive particles having the core/shell construction. Coated abrasive articles utilizing the abrasive particles herein may be suitable for use in grinding and polishing applications, and particularly those applications directed to grinding and polishing of sensitive materials, such as glass, stainless steel, carbon steel and titanium, marble, granite, ceramic tiles and wood.

Figure 1:
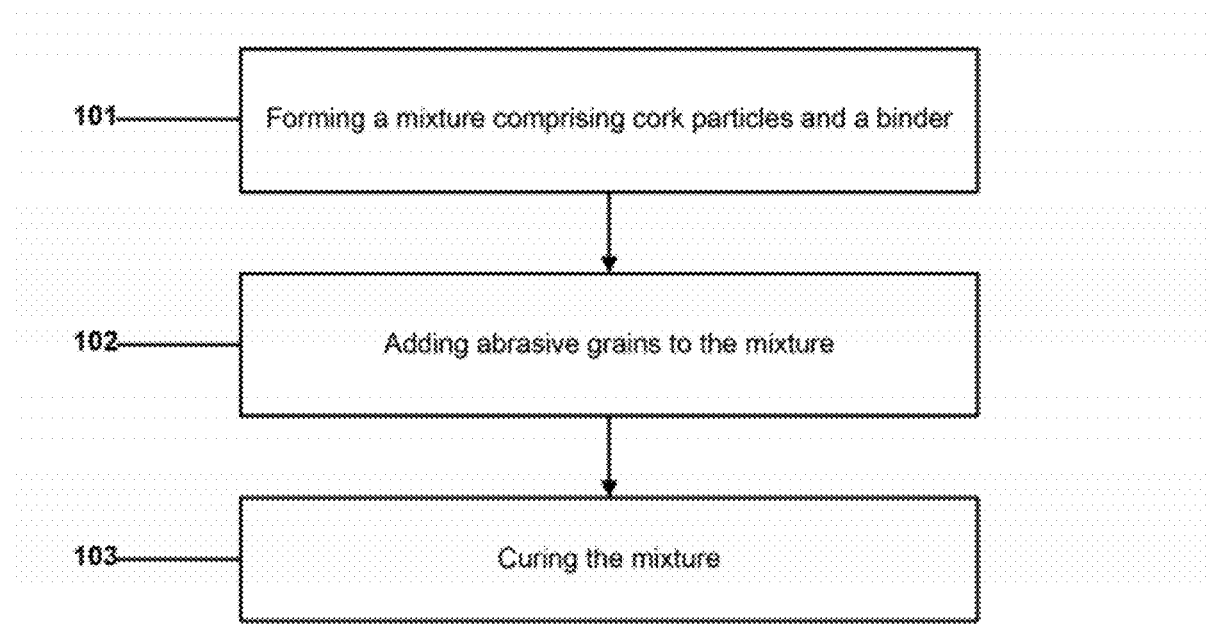
FIG. 1 includes a flow chart for forming an abrasive particle in accordance with an embodiment.

FIG. 1 includes a flow chart providing a process of forming an abrasive particle in accordance with an embodiment. As illustrated, the process can be initiated at step 101 by forming a mixture comprising, a compressible material, such as cork particles and a binder. Reference herein to a compressible material can include resilient materials, which are pliable and can be compressed under a force, such as under forces encountered during abrading processes. In particular instances, the compressible material can include a cork material. A cork material can include reference to a naturally-occurring and plant-based material available from the cork oak tree. Notably, the cork material may be a sponge-like and porous material that has a particular resiliency and toughness. Moreover, the cork material can have a particularly high content of suberin, a highly hydrophobic, naturally-occurring organic material. The cork material can be the same as the material utilized for closing and sealing of wine bottles. Such resiliency can make the material suitable for use in particular abrasive applications, such as polishing of sensitive materials. Alternatively, a synthetic cork material could also be used.

The compressible material can have a varying resiliency of a substantially pliable nature facilitating deformation of the material under forces utilized during abrasive applications. Moreover, the compressible material can have a particular toughness, notably an increased toughness as compared to typical abrasive materials utilizing monolithic grains of oxides, nitrides, borides, carbides, and the like.

In accordance with an embodiment, the core can be a particulate material having an average particle size of at least about 0.01 mm. In other instances, the core can have an average particle size of at least about 0.05 mm, such as at least about 0.1 mm, at least about 0.25 mm, or even at least about 0.5. Still, the core can have an average particle size that is not greater than about 10 mm, such as not greater than about 5 mm, not greater than about 3 mm, or even not greater than about 2 mm. The following description references cork particles as an exemplary form of compressible material suitable for use in the core, however, it will be appreciated that other core particles made of a compressible material can be used.

The binder material can be added to the mixture with the cork particles and mixed until the binder material suitably covers the exterior surfaces of the cork particles. Mixing can include a shearing process to facilitate complete coverage of the binder material on the exterior surfaces of the cork particles.

The binder material can be a thermally curable binder material. Alternatively, the binder material can be a radiation curable binder material. According to one embodiment, the binder material can include a polymer material selected from the group of materials consisting of phenolic resin, urea formaldehyde, urethanes, epoxies, polyimides, polyamides, polyester, acrylates, polyvinyls, protein-based materials, starch-based materials, and a combination thereof. In certain instances, the binder material can include a combination of natural and synthetic materials. For example, in one particular embodiment, the binder material can include a polyester resin with modified polycarboxylic acid and a polyhydric alcohol x-linking agent, comprising approximately 48% solids loading.

In accordance with another particular embodiment, the binder material can include a polyvinyl acetate, an acrylate, a starch, and a combination thereof. For example, the binder can include a hydrophobic styrene acrylate grafted with starch. Notably, such a binder can cure at lower temperatures as compared to acrylic polyol binders. For certain chemistries of the binder, it can be formulated with a cross-link chemistry that cures through the acrylic acid functionality. Additionally, reactive hydrophobic additives can be added to the material. Some suitable hydrophobic additives include epoxidized fatty acids (soybean oil, grapeseed oil, linseed oil, etc), polyethylene acrylic acids (Michem Prime, Michelman), stearylated acrylates (Aquesize 914, Solv), emulsified asphalt or coal tar based resins, hydrophobic acrylics (Lubritan S P, Rohm and Haas), and maleated PE or PP waxes.

Furthermore, external cross-linkers for the starch grafted monomer chemistry include reagents that effectively cross-link polyol functionality such as TACT triazine cross-linker (e.g., Cylink 2000, Cytec), epoxy silanes (e.g., Coat-O-1770, GE Silicones), zirconium ammonium carbonate (e.g., Eka AZC 5880LN, Eka), glyoxal (e.g., Eka RC5550, Eka), water dispersed blocked isocyanates (e.g., API-BI792, Advanced Polymer Inc.), water dispersable epoxies (e.g., API-EC11, Advanced Polymer Inc.), water dispersable isocyanates (Desmodur DA-L, Bayer), and polyamidoamide epichlorohydrin resins (Kymene® 557 H, Hercules).

External cross-linkers for the acrylic acid modified polyvinyl acetate binder chemistry include reagents that react with the carboxylic acid functionality such as carbodiimides (e.g., XR5580, Stahl) aziridines (e.g., Xama 7, Noveon), water dispersable epoxies and epoxy silanes, water dispersed oxazoline (e.g., APR-500, Advanced Polymer, Inc.), and polyamidoamide epichlorohydrin resins (Kymene® 557 H, Hercules).

After suitably forming a mixture containing the cork particles and binder, the process can continue at step 102 by adding abrasive grains to the mixture. According to an embodiment, the abrasive grains can include a material such as a nitride, carbide, oxide, boride, oxynitride, oxyboride, diamond, and a combination thereof. In certain instances, the abrasive grains can include a material such as silica, alumina, zirconia, silicon carbide, silicon nitride, boron nitride, aluminum nitride, fused alumina zirconia, ceria, titanium diboride, boron carbide, garnet, diamond, flint, emery, and a combination thereof. In more particular instances, the abrasive grains can include a superabrasive material. According to one embodiment, abrasive grains can include silicon carbide, and may even consist essentially of silicon carbide.

Generally, the abrasive grains can have an average particle size of not greater than about 250 microns. Yet, in other instances, the average particle size of the abrasive grains can be smaller, such as not greater than about 200 microns, not greater than about 150 microns, not greater than about 100 microns, not greater than about 80 microns, not greater than about 60 microns, or not even greater than about 50 microns. Still, in accordance with an embodiment, the abrasive grains can have an average particle size of at least about 0.01 microns, such as at least about 0.05 microns, or even at least about 0.1 microns. It will be appreciated that the abrasive grains can have an average particle size within a range between any of the minimum values and maximum values noted above.

In one particular process, the abrasive grains can be selected such that a multimodal size distribution of abrasive grains is added to the mixture. For example, the abrasive grains added to the mixture can include a bimodal size distribution of abrasive grains such that a portion of the abrasive grains have a fine average particle size and another portion of the abrasive grains are coarse particle, having a coarse particle size that is significantly greater than the fine average particle size material. Notably, the size difference in the average particle size between the fine material and coarse material can be significant enough to create a bimodal size distribution.

The mixture, containing core particles, binder, abrasive grains, and an amount of liquid carrier can contain a minor amount of core particles. For example, the mixture can include not greater than about 25 wt % cork particles for the entire weight of the mixture. In other instances, the weight percent of the cork particles can be less, such as not greater than about 18 wt %, not greater than about 15 wt %, not greater than about 12 wt %, or even not greater than about 10 wt %. Certain mixtures can be formed such that the amount of cork particles present can be at least about 1 wt %, such as at least about 2 wt %, at least about 3 wt %, or even at least about 4 wt % of the total weight of the mixture. It will be appreciated that the mixture can contain an amount of cork particles within a range between any of the minimum and maximum percentages noted above.

The mixture containing the cork particles, binder, abrasive grains, and liquid carrier can include a minor amount of binder. For example, the mixture can include not greater than about 40 wt % binder materials for the total weight of the mixture. In other embodiments, the mixture can include not greater than about 30 wt %, such as not greater than about 25 wt %, or even not greater than about 20 wt % binder for the entire weight of the mixture. Still, the mixture can be formed such that it contains at least about 5 wt %, such as at least about 8 wt %, or even at least about 10 wt % of binder material for the total weight of the mixture. It will be appreciated that the mixture can contain an amount of binder within a range between any of the minimum and maximum percentages noted above.

Furthermore, the mixture can be formed such that the abrasive grains are present in majority content as measured by weight percent. For example, the mixture can be formed such that it contains at least 50 wt % abrasive particles for the total weight of the mixture. In other embodiments, the amount of abrasive grains can be greater, such as at least about 55 wt %, at least about 60 wt %, at least about 65 wt %, or even at least about 70 wt %. Still, the amount of abrasive grains within the mixture can be not greater than about 95 wt %, not greater than about 90 wt %, not greater than about 85 wt %, or even not greater than about 80 wt % for the total weight of the mixture.

In addition to abrasive grains, other particles, such as filler particles, may also be added to the mixture for coating of the cork particles. Some suitable filler materials can include antistatic agents, such as graphite, carbon black, and the like; suspending agents, such as fumed silica; anti-loading agents, such as zinc stearate; lubricants such as wax; wetting agents; dyes; viscosity modifiers; dispersants; defoamers; or any combination thereof. Particular filler materials can include functional fillers such as wollastonite, calcium difluoride, calcium carbonate, aluminum anhydride, cryolite, potassium boron fluoride, and the like.

The mixture can contain a particular ratio of components. Notably, the ratio of components in the mixture can be based on the weight of the mixture containing only the cork particles, binder, and abrasive particles; the liquid carrier may not necessarily be considered. In accordance with an embodiment, the mixture can be formed such that it has a ratio (Wb:Wag) of at least about 1:1, wherein Wb is the weight percent of the binder material for the weight of the mixture and Wag is the weight percent of the abrasive grains for the weight of the mixture. As such, in other embodiments, the ratio of the weight percent of the binder material to the weight percent of the abrasive grains (Wb:Wag) can be at least about 1:1.5, such as at least about 1:2, at least about 1:2.5, at least about 1:3, at least about 1:3.5, at least about 1:4, or even at least about 1:5. In particular instances, the ratio of the weight percent of the binder to the weight percent of the abrasive grains can be not greater than about 1:20, such as not greater than about 1:18, not greater than about 1:15, or even not greater than about 1:12. It will be appreciated that the ratio can be within a range between any of the minimum and maximum ratios noted above. Such a ratio can ensure proper features in the finally-formed abrasive particle, including coverage of the abrasive grains on the cork particle and thickness of the material layers overlying the core.

A particular ratio may exist between the amount of abrasive grains relative to the amount of cork for a mixture, wherein the liquid carrier is not considered as a part of the total weight of the mixture. For example, the mixture can have a ratio (Wag:Wc) of at least about 2:1, wherein Wc is the weight percent of the cork particles for the weight of the mixture, and Wag is the weight percent of the abrasive grains for the weight of the mixture. For certain mixtures, the ratio (Wag:Wc) can be at least about 3:1, such as at least about 4:1, at least about 5:1, at least about 6:1, at least about 7:1, at least about 8:1, at least about 10:1, at least about 12:1, at least about 14:1, at least about 18:1, or even at least about 20:1. Still, in particular instances the ratio (Wag:Wc) can be not greater than about 40:1, such as not greater than about 30:1, or even not greater than about 25:1. It will be appreciated that the ratio can be within a range between any of the minimum and maximum ratios noted above. Such a ratio can ensure proper features in the finally-formed abrasive particle, including coverage of the abrasive grains on the cork particle and thickness of the layers overlying the core.

Moreover, a particular ratio (Wb:Wc) may exist between the amount of binder relative to the amount of cork for a mixture, wherein the liquid carrier is not considered as a part of the total weight of the mixture. For example, the ratio (Wb:Wc) can be at least about 1:1, wherein Wb is the weight percent of the binder material for the weight of the mixture and Wc is the weight percent of the cork for the mixture. As such, in other embodiments, the ratio of the weight percent of the binder material to the weight percent of the cork (Wb:Wc) can be at least about 1:1.5, such as at least about 1:2, at least about 1:2.5, at least about 1:3, at least about 1:3.5, or even at least about 1:4. In particular instances, the ratio of the weight percent of the binder to the weight percent of the cork can be not greater than about 1:20, such as not greater than about 1:18, not greater than about 1:15, not greater than about 1:12, not greater than about 1:10, or even not greater than about 1:8. It will be appreciated that the ratio can be within a range between any of the minimum and maximum ratios noted above. Such a ratio can ensure proper features in the finally-formed abrasive particle, including coverage of the abrasive grains on the cork particle and thickness of the layers overlying the core.

For particular abrasive grains, the ratio (Wb:Wc) may be within a certain range to facilitate suitable formation of the composite abrasive particle, and notably, a composite abrasive particle having substantially a single layer of abrasive grains bonded to the surface of the cork particles. For example, for abrasive grains having a loose pack density of less than about 0.5 g/cm$^3$, and particularly between 0.1 g/cm$^3$ and 0.4 g/cm$^3$, the ratio (Wb:Wc) can be within a range between about 1:1 and about 1:10, such as within a range between about 1:1 and about 1:8, within a range between about 1:2 and about 1:8, within a range between about 1:3 and about 1:8, within a range between about 1:2 and about 1:6, within a range between about 1:3 and about 1:6, or even within a range between about 1:3 and about 1:5.

Moreover, for abrasive grains having a loose pack density of less than about 0.5 g/cm$^3$, and particularly between 0.1 g/cm$^3$ and 0.4 g/cm$^3$, the mixture can be formed to have a particular ratio (Wag:Wc), wherein Wc is the weight percent of the cork particles for the weight of the mixture, and Wag is the weight percent of the abrasive grains for the weight of the mixture. The ratio (Wag:Wc) may be within a certain range to facilitate suitable formation of the composite abrasive particle, and notably, a composite abrasive particle having substantially a single layer of abrasive grains bonded to the surface of the cork particles. The ratio (Wag:Wc) can be within a range between about 2:1 and about 10:1, such as within a range between about 2.5:1 and about 8:1, within a range between about 3:1 and about 7:1, within a range between about 3.5:1 and about 6:1, or even within a range between about 4:1 and about 6:1.

For particular abrasive grains, the ratio (Wb:Wc) may be within a certain range to facilitate suitable formation of the composite abrasive particle, and notably, a composite abrasive particle having substantially a single layer of abrasive grains bonded to the surface of the cork particles. For example, for abrasive grains having loose pack density of greater than about 0.5 g/cm$^3$, and particularly 0.6 g/cm$^3$ and above, the ratio (Wb:Wc) can be within a range between about 3:1 and about 1:3, such as within a range between about 2:1 and about 1:2, within a range between about 1.5:1 and about 1:1.5, or even within a range between about 1.2:1 and about 1:1.2.

Moreover, for abrasive grains having loose pack density of greater than about 0.5 g/cm$^3$, and particularly 0.6 g/cm$^3$ and above, the mixture can be formed to have a particular ratio (Wag:Wc). The ratio (Wag:Wc) may be within a certain range to facilitate suitable formation of the composite abrasive particle, and notably, a composite abrasive particle having substantially a single layer of abrasive grains bonded to the surface of the cork particles. According to one embodiment, the ratio (Wag:Wc) can be within a range between about 5:1 and about 20:1, such as within a range between about 6:1 and about 18:1, within a range between about 8:1 and about 15:1, within a range between about 10:1 and about 14:1, or even within a range between about 11:1 and about 13:1.

After adding the abrasive grains to the mixture at step 102, the process can continue at step 103 by curing the mixture. It will be appreciated that curing of the mixture can include curing processes known in the art, including for example exposure to radiation, thermal curing, or exposure to particular reactants. The curing process can facilitate solidification of the binder material and removal of liquid from the mixture. According to one embodiment, the process of curing the mixture can include exposing the mixture to elevated temperatures for a particular duration. For example, the mixture can be exposed to temperatures of at least 50° C., such as at least about 75° C., at least about 100° C., or even at least about 150° C. for at least about 20 minutes. In other instances, the mixture can be exposed to temperatures of less than about 300° C., such as less than about 250° C., or even less than 200° C. It will be appreciated that the temperature can be within a range between any of the minimum and maximum values noted above.

The duration of curing of the mixture can be at least about 30 minutes. In other embodiments, it may be at least about 40 minutes, such as at least about 50 minutes, at least about 60 minutes, or even longer. Generally, the process of curing does not last for a duration of longer than about 4 hours, such as not greater than about 3 hours, or not greater than about 2 hours.

After suitably curing the mixture at step 103, further processing may be undertaken. For example, a sorting process may be undertaken to remove particles of unwanted sizes. It will be appreciated that suitable means for sorting of the particles can include using sieves to gather abrasive particles of a desired size distribution.

Figure 2:
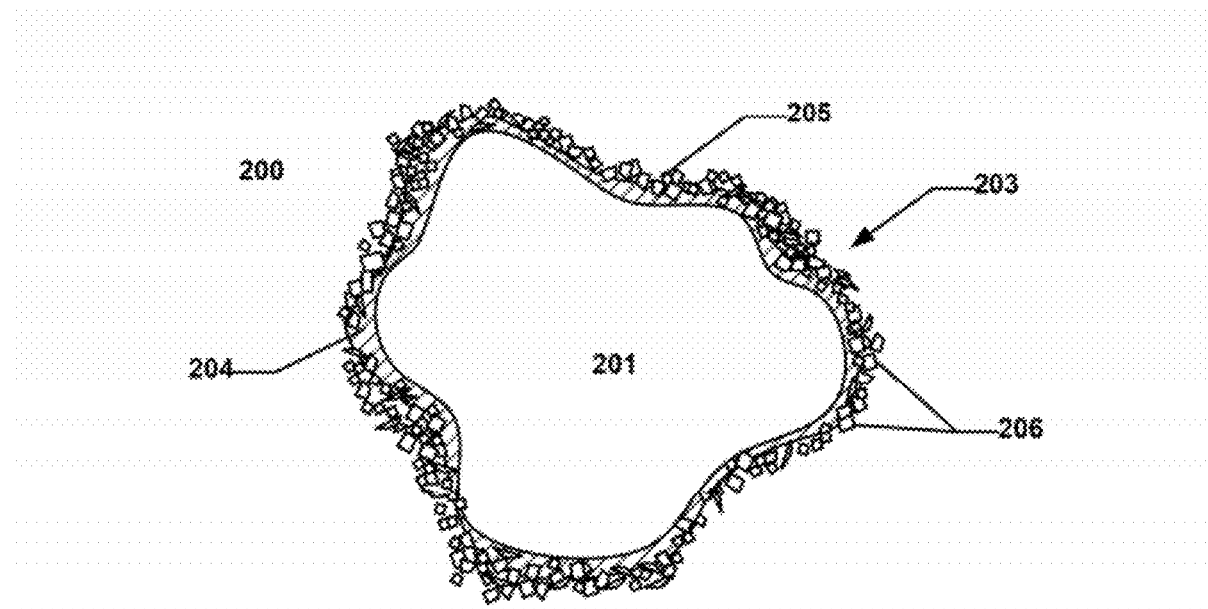
FIG. 2 includes a cross-sectional illustration of an abrasive particle in accordance with an embodiment.

FIG. 2 includes a cross-sectional illustration of an abrasive particle in accordance with an embodiment. As illustrated, the abrasive particle 200 can be a composite abrasive particle having a core/shell construction using multiple materials and a layered construction. The abrasive particle 200 can include a core 201 comprising the compressible material (e.g., cork) and a shell layer 203 overlying the exterior surface of the core 201. In accordance with an embodiment, the core 201 can include at least about 70 vol % compressible material. In other embodiments, the amount of compressible material within the core 201 can be greater, such as at least about 80 vol %, at least about 90 vol %, at least about 95 vol %, or in some instances the core 201 can consist essentially of a compressible material, such as cork.

The abrasive particle 200, including the core 201 and shell layer 203 can have an average particle size that can be at least about 0.05 mm, at least about 0.1 mm, at least about 0.25 mm, or even at least about 0.5 mm Still, the abrasive particle can have an average particle size of not greater than about 20 mm, such as not greater than about 15 mm, not greater than about 10 mm, not greater than about 8 mm, not greater than about 6 mm, not greater than about 5 mm, not greater than about 3 mm, or even not greater than about 2 mm.

The core 201 can be formed of cork and have an average particle size similar to that of the average particle size of the cork particles contained within the original mixture. As such, the core can have an average particle size of at least about 0.01 mm, such as at least about 0.05 mm, at least about 0.1 mm, at least about 0.25 mm, or even at least about 0.5 mm. Still, the core 201 can have an average particle size of not greater than about 10 mm, such as not greater than about 5 mm, not greater than about 3 mm, or even not greater than about 2 mm.

As illustrated in FIG. 2, the shell layer 203 can include an intermediate layer 204 overlying the core 201. The intermediate layer 204 can be in direct contact with the external surface of the core 201. More particularly, the intermediate layer 204 can be bonded directly to the exterior surface of the core 201. In accordance with an embodiment, the intermediate layer 204 can include the binder material.

Furthermore, the shell layer 203 can include an outer layer 205 overlying the intermediate layer 204. The outer layer 205 can include abrasive grains 206. The outer layer 205 can be bonded directly to the intermediate layer 204. More particularly, the outer layer 205 can include abrasive grains 206, which are imbedded into the intermediate layer 204. In particular instances, a portion of the abrasive grains 206 within the outer layer 205 can be in direct contact with the core 201. For certain abrasive particles 200, the outer layer can be formed such that at least a portion of the outer layer 205 contains a single layer of abrasive grains 206 overlying and bonded to the intermediate layer 204. In fact, in certain instances, the abrasive particle 200 can be formed such that a majority of the outer layer 205 defines a substantially single layer of abrasive grains 206 bonded to the intermediate layer 204.

In accordance with an embodiment, the outer layer 205 can have an average thickness that is not greater than about 25 times the average thickness of the abrasive grains 206, which form the outer layer 205. In other instances, the outer layer 205 can have an average thickness that is not greater than about 18 times, such as not greater than about 15 times, not greater than about 12 times, not greater than about 10 times, not greater than about 8 times, or even not greater than about 6 times the average thickness of the abrasive grains 206. In fact, in one particular instance, the abrasive particle 200 can be formed such that the outer layer 205 has an average thickness that is substantially the same as the average thickness of the individual abrasive grains 206, and therefore, defining an abrasive particle 200 having a single coating of abrasive grains 206 overlying and bonded to the intermediate layer 204 and defining the outer layer 205.

Still, in particular instances, the outer layer 205 can have an average thickness that is at least 1.5 times the average thickness of the abrasive grains 206, such as at least 2 times, or even at least 3 times the average thickness of the abrasive grains 206.

In accordance with an embodiment, the outer layer 205 may be formed such that is has a particular porosity. For example, the outer layer 205 can have a porosity of at least 5 vol % for the total volume of the outer layer 205. In other instances, the outer layer can have a porosity of at least about 10 vol %, such as at least about 15 vol %, at least about 20 vol %, or even at least about 25 vol % of the total volume of the outer layer 205. Still, the porosity of the outer layer 205 can be limited, such that it is not greater than about 70 vol %, such as not greater than about 60 vol %, not greater than about 55 vol %, not greater than about 50 vol %, or even not greater than about 45 vol % of the total volume of the outer layer 205. The volume of porosity of the outer layer 205 can be within a range between any of the minimum and maximum percentages noted above.

It will be appreciated that the abrasive grains 206 can have an average particle size that is the same as the abrasive grains added to the mixture as noted above. Furthermore, the abrasive grains can have the same material composition as the abrasive grains added to the mixture as noted above.

The intermediate layer 204 can be bonded directly to the exterior surface of the core 201. Moreover, the intermediate layer 204 can be preferentially disposed along the exterior surface of the core to facilitate bonding of the abrasive grains 206 of the outer layer 205 to the core 201. The intermediate layer 204 can have a notably small average thickness, such that it is in the form of a film overlying the exterior surface of the core 201. For example, the intermediate layer 204 can have an average thickness that is not greater than about 20% of the average particle size of the core 201. In other embodiments, the intermediate layer 204 can have an average thickness that is not greater than about 15%, such as not greater than about 12%, not greater than about 10%, or even not greater than about 5% of the average particle size of the core 201. Still, the intermediate layer 204 can be formed such that it has an average thickness of at least 0.01, such as at least 0.05%, or even at least about 0.1% of the average particle size of the core 201. The average thickness of the intermediate layer 204 can be within a range between any of the minimum and maximum percentages noted above.

Notably, the intermediate layer 204 can be formed such that it has an average thickness that is less than the average particle size of the abrasive grains 206 contained within the outer layer 205. For example, the intermediate layer 204 can be formed such that it has an average thickness that is not greater than about 80% of the average particle size of the abrasive grains 206. In other embodiments, the intermediate layer 204 can be thinner, such that is has an average thickness that is not greater than about 70%, such as not greater than about 60%, not greater than about 50%, not greater than about 40%, or even not greater than about 30% of the average particle size of the abrasive grains 206 contained within the outer layer 205. Still, in accordance with an embodiment, the intermediate layer 204 can have an average thickness that is at least 0.01%, such as at least about 0.05%, or at least about 0.1% of the average particle size of the abrasive grains 206 contained within the outer layer 205. The average thickness of the intermediate layer 204 can be within a range between any of the minimum and maximum percentages noted above. Notably, such thicknesses of the intermediate layer 204 can facilitate a distinct structure for the particle 200, such that the intermediate layer 204 can be in the form of a film of material that overlies the exterior surface of the core 201 and abrasive grains 206 can be bonded to the intermediate layer, thus placing a suitable amount of abrasive grains 206 in position to abrade a workpiece and minimizing the amount of intermediate layer material at the external surface of the outer layer 205.

In more particular terms, the intermediate layer 204 can be formed such that it has an average thickness that is not greater than about 10 microns. In other embodiments, the intermediate layer 204 can be formed such that it has an average thickness that is not greater than about 8 microns, such as not greater than about 5 microns, not greater than about 3 microns, not greater then about 1 micron, or even not greater than about 0.1 microns. Still, the intermediate layer 204 can be formed such that the average thickness can be at least about 0.01 microns, such as at least about 0.02 microns, or even at least about 0.05 microns. It will be appreciated that the intermediate layer 204 can have an average thickness within a range between any of the minimum values and maximum values noted above.

The intermediate layer 204 can be made of the binder material of the mixture. It will be appreciated that the intermediate layer 204 can contain a majority content of the binder utilized within the initial mixture. In fact, the intermediate layer can comprise not less than about 90 vol %, not less than about 95 vol %, or even consist essentially of the binder material provided within the initial mixture.

In accordance with an embodiment, the abrasive article 200 can be formed such that it has a particular shell layer ratio (Wi:Wo) defining a ratio of weight percent of the intermediate layer 204 for the entire weight of the abrasive particle 200 as compared to the weight percent of the outer layer 205 comprising the abrasive grains 206 for the entire weight of the abrasive particle 200. Notably, the shell layer ratio (Wi:Wo) can have a value of at least 1:1. In other instances, the shell layer ratio can be at least about 1:1.5, such as at least about 1:2, such as at least about 1:2.5, at least about 1:3, at least about 1:3.5, at least about 1:4, or even at least 1:5. Still, the abrasive particle 200 can be formed such that the shell layer ratio (Wi:Wo) is not greater than about 1:20, such as not greater than about 1:18, not greater than about 1:15, not greater than about 1:12, not greater than about 1:10, such as not greater than about 1:8, or even not greater than about 1:6. The shell layer ratio can be within a range between any of the minimum and maximum ratios noted above.

The abrasive particle 200 can be formed such that is has a suitable ratio (Wo:Wc) between the weight percent of the outer layer as compared to the core, and in particular, the ratio (Wo:Wc) can be the weight percent of the outer layer 205 comprising the abrasive grains 206 for the entire weight of the abrasive particle 200 as compared to the weight percent of cork comprising the core 201 for the total weight of the abrasive particle 200. As such, in accordance with an embodiment, the ratio (Wo:Wc) of abrasive grain to cork can be at least about 5:1. In other embodiments, the ratio can be at least 8:1, such as at least 10:1, at least about 12:1, at least about 15:1, at least about 18:1, or even at least about 20:1. Still, in accordance with an embodiment, the ratio (Wo:Wc) can be not greater than about 40:1, such as not greater than about 30:1, or even not greater than about 25:1. The ratio (Wo:Wc) can be within a range between any of the minimum and maximum ratios noted above.

Additionally, the abrasive particle 200 can have a particular ratio (Wi:Wc) of the weight percent of the intermediate layer 204 for the total weight of the abrasive particle 200 as compared to the weight percent of cork comprising the core 201 for the total weight of the abrasive particle 200. For example, the ratio (Wi:Wc) can be at least about 1:1. In other embodiments, the ratio (Wi:Wc) can be at least about 1:1.5, such as at least about 1:2, at least about 1:2.5, at least about 1:3, at least about 1:3.5, or even at least about 1:4. In particular instances, the ratio (Wi:Wc) can be not greater than about 1:20, such as not greater than about 1:18, not greater than about 1:15, not greater than about 1:12, not greater than about 1:10, or even not greater than about 1:8. It will be appreciated that the ratio (Wi:Wc) can be within a range between any of the minimum and maximum ratios noted above.

Figure 3:
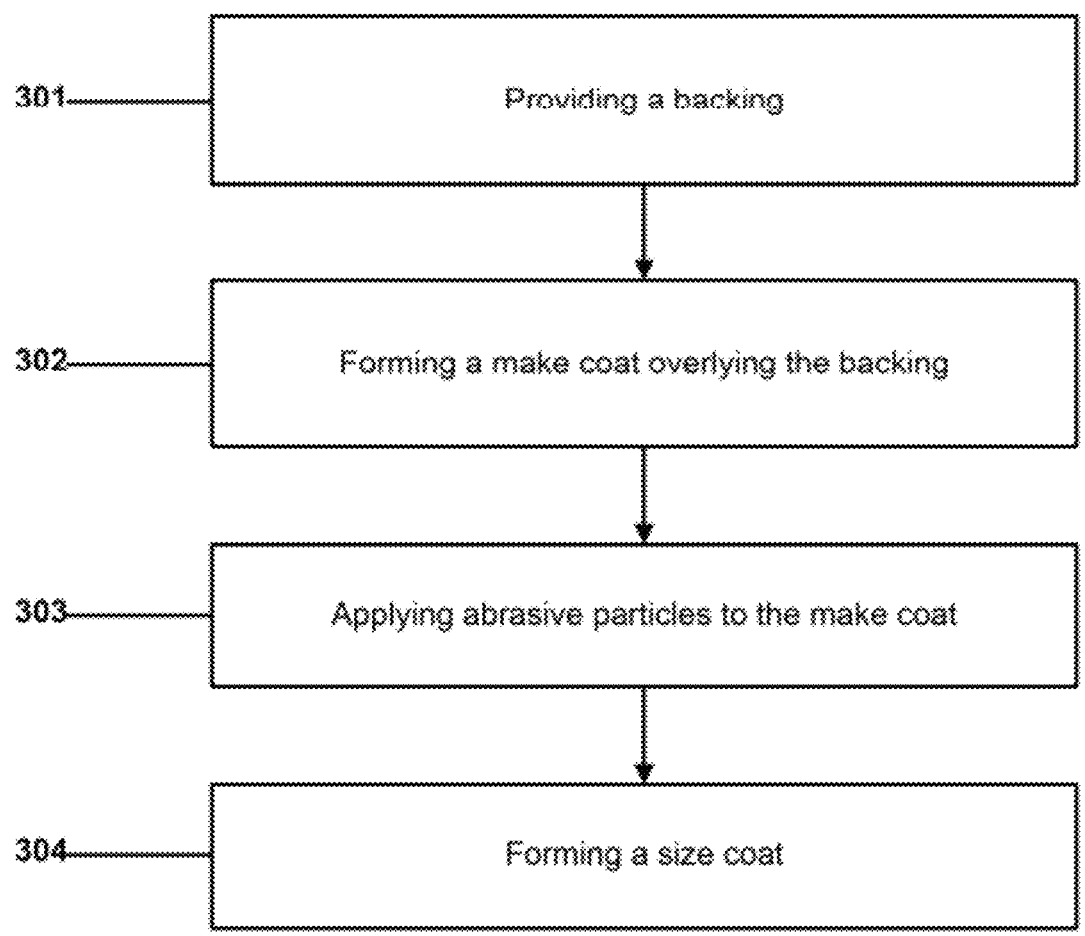
FIG. 3 includes a flow chart providing a process for forming a coated abrasive utilizing the abrasive particle in accordance with an embodiment.

FIG. 3 includes a flow chart providing a process for forming a coated abrasive article in accordance with an embodiment. Notably, the coated abrasive article can incorporate the abrasive particles described herein. The process can be initiated at step 301 by providing a backing. In accordance with an embodiment, the backing can be a material selected from the group of materials such as organic materials, inorganic materials, natural materials, synthetic materials, and a combination thereof. The backing may be flexible or rigid and may be made of various materials. An exemplary flexible backing includes a polymeric film (for example, a primed film), such as polyolefin film (e.g., polypropylene including biaxially oriented polypropylene), polyester film (e.g., polyethylene terephthalate), polyamide film, or cellulose ester film; metal foil; mesh; foam (e.g., natural sponge material or polyurethane foam); cloth (e.g., cloth made from fibers or yarns comprising polyester, nylon, silk, cotton, poly-cotton, or rayon); paper; vulcanized paper; vulcanized rubber; vulcanized fiber; nonwoven materials; any combination thereof; or any treated version thereof. Cloth backings may be woven or stitch bonded. In an exemplary embodiment, the backing includes a thermoplastic film, such as a polyethylene terephthalate (PET) film. In particular, the backing may be a single layer polymer film, such as a single layer PET film. An exemplary rigid backing includes a metal plate, a ceramic plate, or the like.

Typically, the backing can have a thickness of at least about 50 microns, such as greater than about 60 microns. For example, the backing may have a thickness of greater than about 75 microns and not greater than about 200 microns, or greater than about 75 microns and not greater than about 150 microns.

After providing a backing 301, the process can continue at step 302 by forming a make coat overlying the backing. The make coat can be applied to a surface of the backing using suitable deposition techniques as known in the art. For example, suitable deposition techniques can include spraying, brushing, bladeing, printing, dipping, and a combination thereof. The make coat can overlie the backing, and particularly, may be bonded directly to a surface of the backing. The make coat can facilitate bonding of the abrasive grains to the backing such that it is disposed between the backing and the abrasive grains.

In accordance with an embodiment, the make coat can include a material such as organic materials, inorganic materials, and a combination thereof. More particularly, the make coat can include one or more make coat binder materials. For example, suitable make coat binder materials can include a single polymer or a blend of polymers, which may include one or more thermoset and/or thermoplastic polymer materials. For example, the make coat binder material may be formed from epoxy, acrylic polymer, or a combination thereof. The make coat binder material can include a polymer matrix, which binds the abrasive grains to the abrasive layer. Typically, the make coat binder material is formed of cured binder formulation. For the preparation of the polymer component, the make coat binder material formulation may include one or more reaction constituents or polymer constituents. A polymer constituent may include a monomeric molecule, an oligomeric molecule, a polymeric molecule, or a combination thereof.

The make coat binder material formulation may further include components such as dispersed filler, solvents, plasticizers, chain transfer agents, catalysts, stabilizers, dispersants, curing agents, reaction mediators, or agents for influencing the fluidity of the dispersion. In addition to the above constituents, other components may also be added to the make coat binder material formulation, including, for example, anti-static agents, such as graphite, carbon black, and the like; suspending agents, such as fumed silica; anti-loading agents, such as zinc stearate; lubricants such as wax; wetting agents; dyes; fillers; viscosity modifiers; dispersants; defoamers; or any combination thereof. Fillers can include functional fillers such as wollastonite, calcium difluoride, calcium carbonate, aluminum anhydride, cryolite, potassium boron fluoride, and the like. In particular instances, the make coat include includes a single filler of wollastonite in the make coat.

In addition, the make coat binder material may include a filler material, such as a nano-sized filler or a combination of nano-sized filler and micron-sized filler. In a particular embodiment, the make coat binder material includes a colloidal binder, wherein the formulation that is cured to form the make coat binder material is a colloidal suspension including particulate filler. Alternatively, or in addition, the make coat binder material may be a nanocomposite binder or coating material including sub-micron particulate filler.

The make coat can be a thin layer facilitating bonding between the abrasive particles and the backing. For example, the make coat can have an average thickness that is not greater than about 80% of the average particle size of the composite abrasive particles. In other instances, the thickness of the make coat can be less, such that it is not greater than about 70%, not greater than about 60%, not greater than about 50%, not greater than about 40%, or even not greater than about 30% of the average particle size of the composite abrasive particles. Still, the make coat can have an average thickness that is at least about 5%, at least about 10%, or even at least about 15% of the average size of the abrasive particles. It will be appreciated that the make coat can have an average thickness within a range between any of the minimum and maximum values noted above.

After suitably forming the make coat at step 302, the process can continue at step 303 by applying abrasive grains to the make coat. The abrasive grains may be applied to the surface of the make coat to bind them to the backing using a variety of techniques including, for example, electrostatic coating, drop coating, or mechanical projection. In other embodiments, the process of step 302 and 303 may be combined such that a mixture is made of the make coat and abrasive grains, wherein after making the mixture, it is applied onto the backing using suitable techniques.

It will be appreciated that the abrasive particles can include the abrasive particles described herein. Notably, the abrasive particles are composite particles including a core comprising cork material and a shell layer comprising an intermediate layer overlying the exterior surface of the core and an outer layer overlying the intermediate layer. Notably, the outer layer can include abrasive grains facilitating abrasive characteristics of the abrasive particles.

It will further be appreciated that the abrasive particles incorporated into the abrasive article can include a mixture of abrasive grit (e.g., monolithic abrasive particles of nitrides, carbides, oxides, oxycarbides, oxyborides, diamond, and a combination thereof) and the abrasive particles of embodiments herein.

A portion of the particles provided within the make coat can be abrasive particles and another content of the particles can be filler particles. The filler particles can have the same construction as the abrasive particles, including a core comprising a cork material, a shell layer comprising an intermediate layer, and an outer layer comprising filler material overlying the intermediate layer. In particular instances, the filler material can be calcium carbonate. In another particular embodiment, the filler material can be wollastonite. The make coat can include a blend of abrasive particles and filler particles.

After depositing the make coat and the abrasive particles on the backing, the make coat can be cured, or at least partially cured. Curing can include suitable techniques as used in the art, including for example, application of heat, application of radiation, application of chemical reactants, and a combination thereof.

After suitably applying the abrasive particles to the make coat, the process can continue by application of a size coat at step 304. The formation of a size coat at step 304 may be optional in certain processes, depending upon the desired application for the coated abrasive article. Application of a size coat can include deposition of a material such that it overlies the abrasive particles and the make coat to secure the abrasive particles to the backing and make coat. In accordance with an embodiment, the size coat can include an organic material, inorganic material, and a combination thereof. Notably, suitable materials for use in the size coat can include the same materials as noted above for use in the make coat. That is, according to one embodiment, the size coat can be formed from a size coat binder material that can be formed from any of the materials suitable for forming the make coat binder material. In more particular embodiments, the size coat binder material can be the same chemical composition as used in the make coat binder material.

In accordance with an embodiment, the size coat can have an average thickness that is less than the average particle size of the composite abrasive particles. Moreover, the size coat can have an average thickness that is greater than the average thickness of the make coat. In certain other instances, the size coat can have an average thickness that is the same as the average thickness of the make coat. In yet another embodiment, the size coat can have an average thickness that is less than the average thickness of the make coat.

In accordance with an embodiment, the size coat can include a filler material. Filler materials can include the materials noted above with regard to the description of fillers in the binder material. Still, in certain exemplary embodiments, the filler material of the size coat can include small abrasive materials including oxides, nitrides, carbides, borides, oxynitrides, oxyborides, diamond, and a combination thereof. In certain instances, the filler can include a material such as silica, alumina, zirconia, silicon carbide, silicon nitride, boron nitride, aluminum nitride, fused alumina zirconia, ceria, titanium diboride, boron carbide, garnet, diamond, flint, emery, and a combination thereof. In more particular instances, the filler material can include a superabrasive material.

Notably, filler materials in the form of abrasive grains can have an average particle size that is significantly less than the average particle size of the composite abrasive particles having the core/shell layer construction described herein. In fact, the filler material can have an average particle size that is not greater than about 50% of the average particle size of the composite abrasive particles. In other instances, the filler material can have an average particle size of not greater than about 40%, not greater than about 30%, not greater than about 10%, not greater than about 1%, or even not greater than about 0.1% of the average particle size of the composite abrasive particles. Moreover, the filler material generally is not a composite material, but rather monolithic grains of a single composition material. For example, the abrasive grains of the size coat can be similar to, the same as, or different from the abrasive grains 206 utilized in the outer layer 205 of the composite abrasive particle 200.

It will be appreciated that for certain processes, a separate coating of material, such as a supersize coat, can be deposited over the size coat. As such, the supersize coat can include filler materials, such as abrasive grains, to facilitate abrading action of the coated abrasive. The supersize coat can be cured with the size coat or cured separately.

Application of the size coat can further include a curing process, or at least a partial curing process, wherein the size coat is exposed to certain conditions to facilitate curing and cross-linking of polymer materials contained within the size coat. Curing can include suitable techniques as used in the art, including for example, application of heat, application of radiation, application of chemical reactants, and a combination thereof.

Figure 4:
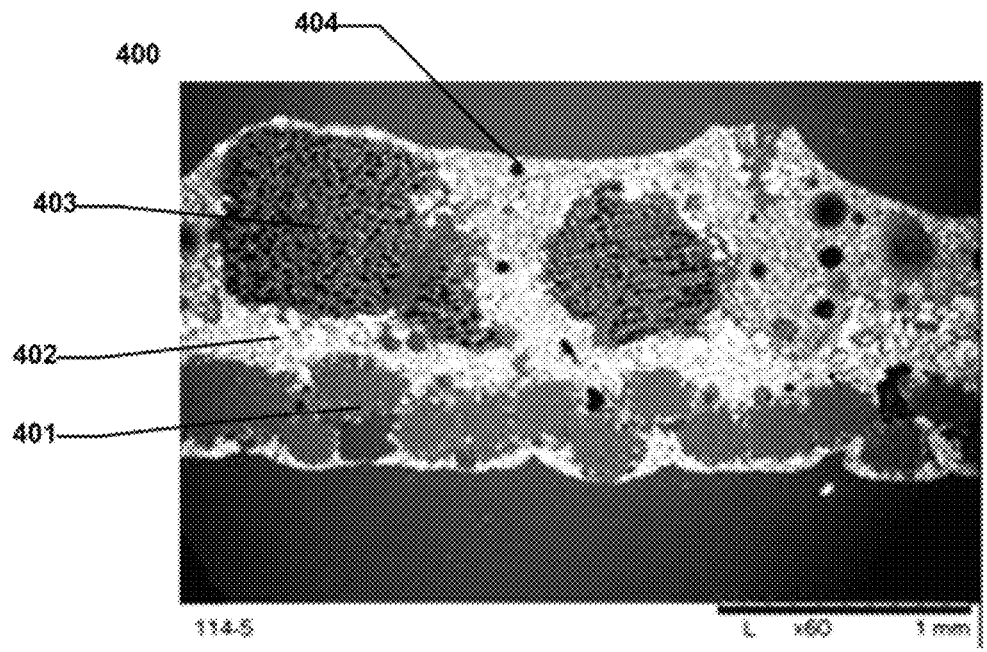
FIG. 4 includes a cross-sectional illustration of a coated abrasive formed according to an embodiment.

FIG. 4 includes a cross-sectional illustration of a portion of a coated abrasive formed according to embodiments herein. As noted, the coated abrasive 400 includes a backing 401. Furthermore, overlying the backing 401 is a make coat 402. As further illustrated, the coated abrasive 400 can be formed such that the composite abrasive particles 403 are bonded directly to the make coat and secured to the backing 401. As further illustrated, the coated abrasive 400 can include a size coat 404, which is overlying the composite abrasive particles 403.

Figure 5:
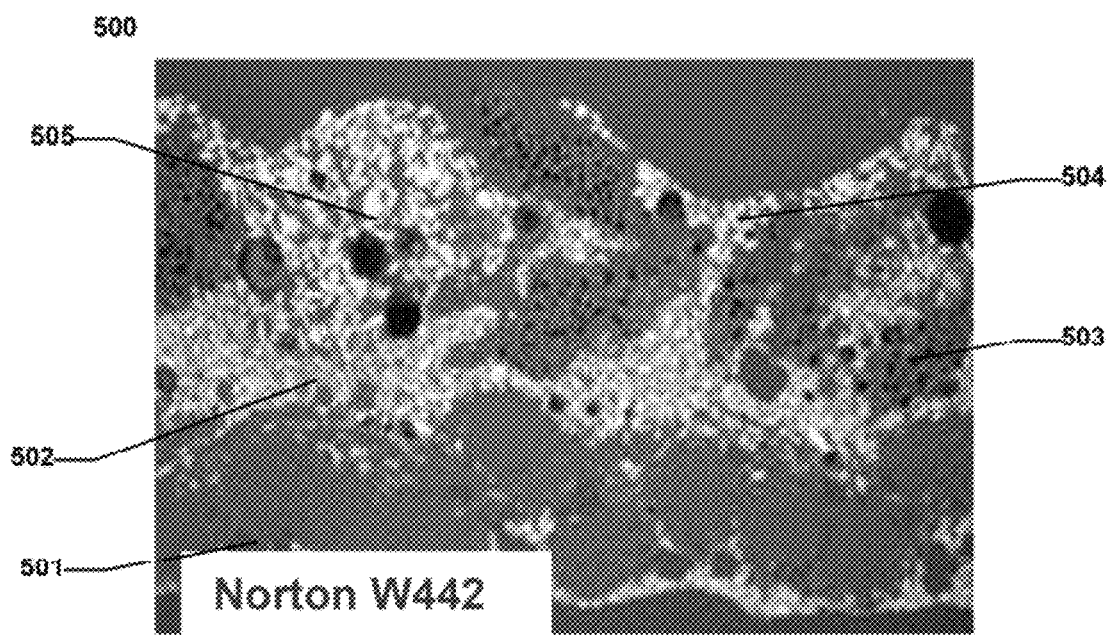
FIG. 5 includes a cross-sectional illustration of a portion of a coated abrasive.

FIG. 5 includes a cross-sectional illustration of a coated abrasive article including cork particles, commercially available as Norton W442 from Saint-Gobain Abrasives. As illustrated, the coated abrasive article 500 can include a backing 501. A make coat 502 overlies the exterior major surface of the backing 501. Furthermore, the coated abrasive article 500 includes cork particles 503 contained within the make coat and bonded to the backing 501. Additionally, the coated abrasive article 500 includes a size coat 504 overlying the composite abrasive particles 503, make coat 502 and backing 501. Notably, the structure of the coated abrasive article 500 includes abrasive particles 506 disposed at an upper surface of the size coat 504 as opposed to surrounding the cork particles 503 as demonstrated in the coated abrasive product of FIG. 4. As illustrated, the coated abrasive article 500 can include a size coat 504 containing filler materials 505. The filler materials can include fine particles, such as abrasive grains, to facilitate improved abrasive capabilities of the coated abrasive article 500.

Figure 6:
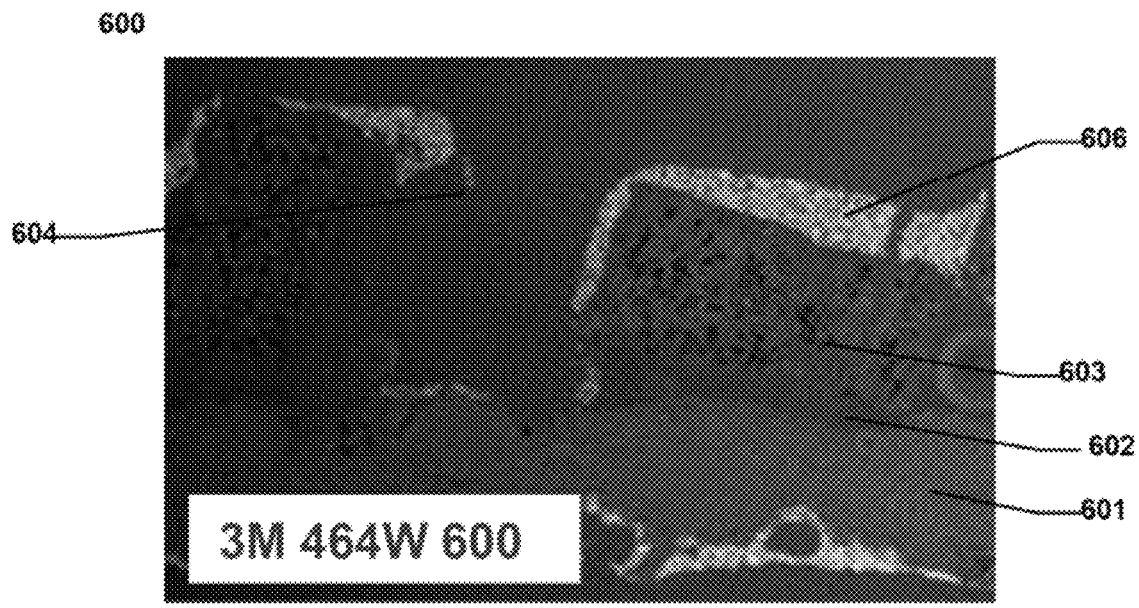
FIG. 6 includes a cross-sectional illustration of a portion of a coated abrasive.

FIG. 6 includes a cross-sectional illustration of a coated abrasive article including cork particles, commercially available as 464 W from 3M. As illustrated, the coated abrasive article 600 can include a backing 601. A make coat 602 overlies the exterior major surface of the backing 601. Furthermore, the coated abrasive article 600 includes cork particles 603 contained within the make coat and bonded to the backing 601. Additionally, the coated abrasive article 600 includes a size coat 604 overlying the composite abrasive particles 603, make coat 602 and backing 601. Notably, the structure of the coated abrasive article 600 includes abrasive particles 606 disposed at an upper surface of the size coat 604 as opposed to surrounding the cork particles 603 as demonstrated in the coated abrasive product of FIG. 4.

EXAMPLES

Example 1

Figure 7:
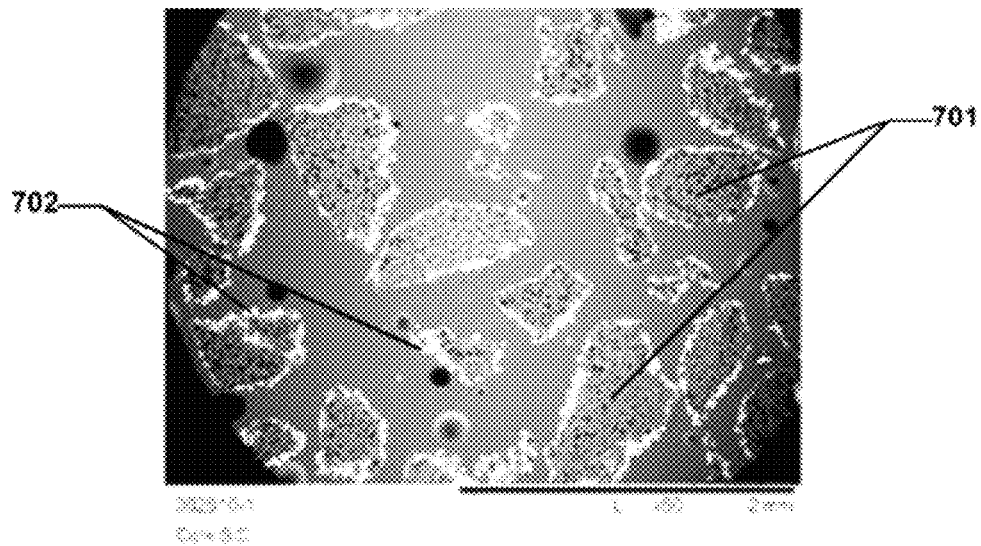
FIG. 7 includes a magnified image of composite abrasive particles formed according to an embodiment.

A first sample (Sample 1) of a composite abrasive particle is formed by adding cork and a binder material into a mix and shearing the mixture. After sufficient duration to moisten the surface of the cork with the binder, abrasive grains are added and mixing continues until the cork particles are covered with the abrasive grains. The composite particles are treated at approximately 180° C. for 1 hour to remove water and cure the binder material. The resulting composite particles are sorted via sieving to select the desired particle size distribution. Table 1 below provides the batching recipe for Sample 1. FIG. 7 includes a picture of the composite abrasive particles of Sample 1. Notably, the particles clearly illustrate a composite nature, including a core 701 comprising the cork particles, and a shell layer 702 including abrasive grains bonded to the cork particles.

TABLE 1

| Sample 1 | Weight (g) | Ratio (Dry) |
|---|---|---|
| Cork | 150 | 1 |
| Binder | 366 | 0.98 |
| Water | 41.3 | |
| Abrasive Grains | 1860 | 12.4 |

Example 2

A second sample (Sample 2) of a composite abrasive particle is formed by mixing cork particles and a binder material made of Degree +40 resin with 4 wt % crosslinker (called Degree +27); Degree +40 is a starch grafted styrene acrylate resin. (37% solids) until the binder sufficiently covers the surface of the cork particles. Abrasive grains are added to the mixture and mixing continues until the cork particles are covered with the abrasive grains. The composite particles are treated at approximately 180° C. for 1 hour to remove water and cure the binder material. The resulting composite particles are sorted via sieving to select the desired particle size distribution. Table 2 below provides the batching recipe for Sample 2.

TABLE 2

| Sample 2 | Weight (lbs) | Ratio (Dry) |
|---|---|---|
| Cork | 5 | 1 |
| Binder | 5.51 | 0.41 |
| Abrasive Grains | 26 | 5.2 |

Example 3

A third sample (Sample 3) of a composite abrasive particle is formed by mixing cork particles and the same binder material as used in Example 1 (37% solids) until the binder sufficiently covers the surface of the cork particles. Abrasive grains are added to the mixture and mixing continues until the cork particles are covered with the abrasive grains. The composite particles are treated at approximately 180° C. for 1 hour to remove water and cure the binder material. The resulting composite particles are sorted via sieving to select the desired particle size distribution. Table 3 below provides the batching recipe for Sample 3.

TABLE 3

| Sample 3 | Weight (lbs) | Ratio (Dry) |
| --- | --- | --- |
| Cork | 5 | 1 |
| Binder | 5.15 | 0.38 |
| Abrasive Grains | 22.75 | 4.6 |

Example 4

A fourth sample (Sample 4) of a composite abrasive particle is formed by mixing cork particles and the same binder material of Example 1 (37% solids) until the binder sufficiently covers the surface of the cork particles. Abrasive grains are added to the mixture and mixing continues until the cork particles are covered with the abrasive grains. The composite particles are treated at approximately 180° C. for 1 hour to remove water and cure the binder material. The resulting composite particles are sorted via sieving to select the desired particle size distribution. Table 4 below provides the batching recipe for Sample 4.

TABLE 4

| Sample 4 | Weight (g) | Ratio (Dry) |
| --- | --- | --- |
| Cork | 600 | 1 |
| Binder | 560 | 0.35 |
| Abrasive Grains | 2600 | 4.3 |

Example 5

A coated abrasive article is formed using the composite particles of Example 2, which is illustrated in FIG. 4. A make coat comprising phenol formaldehyde resin material, commercially available from Schenectady International Corporation is coated by a two-roll direct process onto a backing of polyester commercially available from Milliken Textured Yarns. The composite abrasive particles of Sample 2 are placed on the make coat using a gravity coating procedure. The make coat is cured in an oven at 180° F. to 240° F. for 1.5 hours. Finally, a size coat is deposited on the abrasive particles and the make coat. The size coat is a phenol formaldehyde resin material commercially available as HRJ15993 from Schenectady International Corporation.

Example 6

A coated abrasive article is formed using the composite particles of Example 4. A make coat comprising phenolic resin material, commercially available from Schenectady International Corporation is roll coated onto a backing of polyester commercially available from Milliken Textured Yarns. The composite abrasive particles of Example 4 are placed on the make coat using a gravity coating procedure. Finally, a size coat is deposited on the abrasive particles and the make coat. The size coat is a mixture made of phenolic resin material commercially available as HRJ15993 from Schenectady International. The size coat incorporates abrasive grains of the same type as used in the making of abrasive grain coated cork particles.

Example 7

A coated abrasive article is formed using the composite particles of Example 2. A make coat comprising phenol formaldehyde resin material, commercially available from Schenectady International Corporation is coated by a two-roll direct process onto a backing of polyester commercially available from Milliken Textured Yarns. The composite abrasive particles of Sample 2 are placed on the make coat using a gravity coating procedure. The make coat is cured in an oven at 180° F. to 240° F. for 1.5 hours. Finally, a size coat is deposited on the abrasive particles and the make coat. The size coat is a phenol formaldehyde resin material commercially available as HRJ15993 from Schenectady International Corporation.

A comparative grinding test was conducted between the coated abrasive of Example 7 (i.e., exemplary sample) and a conventional coated abrasive product containing cork particles, designated W442 and commercially available from Saint-Gobain Abrasives, which is illustrated in FIG. 5. The grinding test is a wet centerless grinding test using belt sizes of 3 inches by 98 inches, on a Loeser Grinding Machine, under an applied force of 30 lbs. The workpiece is 304 stainless steel. The test includes grinding of 40 parts and a measure of the material removal rate, wear, and surface finish.

Figure 8A:
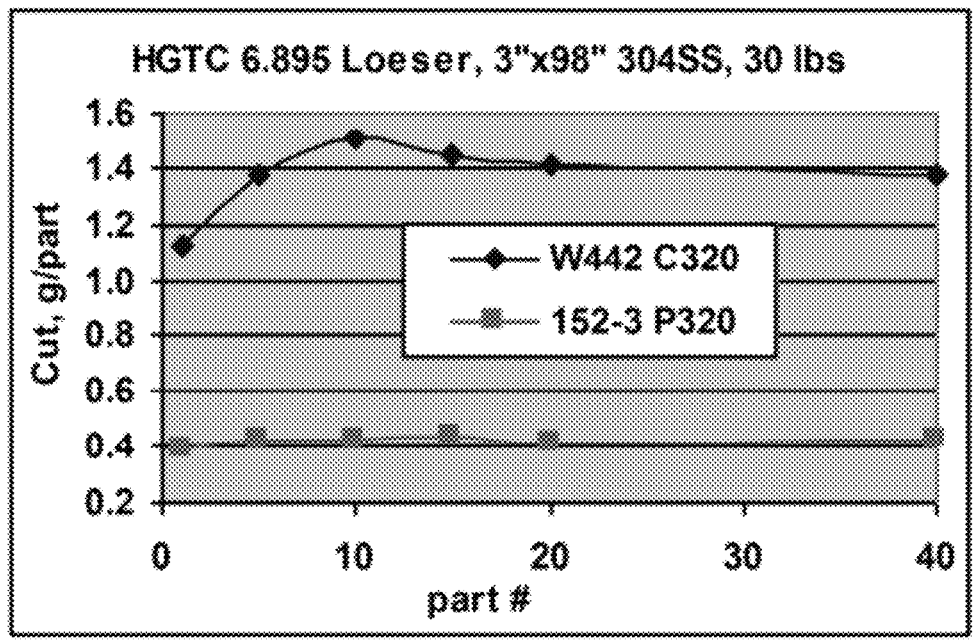
FIG. 8A includes a plot of cut (g/part) versus part for an exemplary sample formed according to an embodiment and a conventional sample.

FIG. 8A includes a plot of cut (g/part) versus part for the exemplary sample and conventional sample. As illustrated, the exemplary sample made according to an embodiment demonstrates significantly greater consistency in cut. Notably, the cut per part is maintained throughout the grinding operation for the exemplary sample. By comparison, the conventional sample demonstrated significantly greater variation in the effective cut between different parts.

Figure 8B:
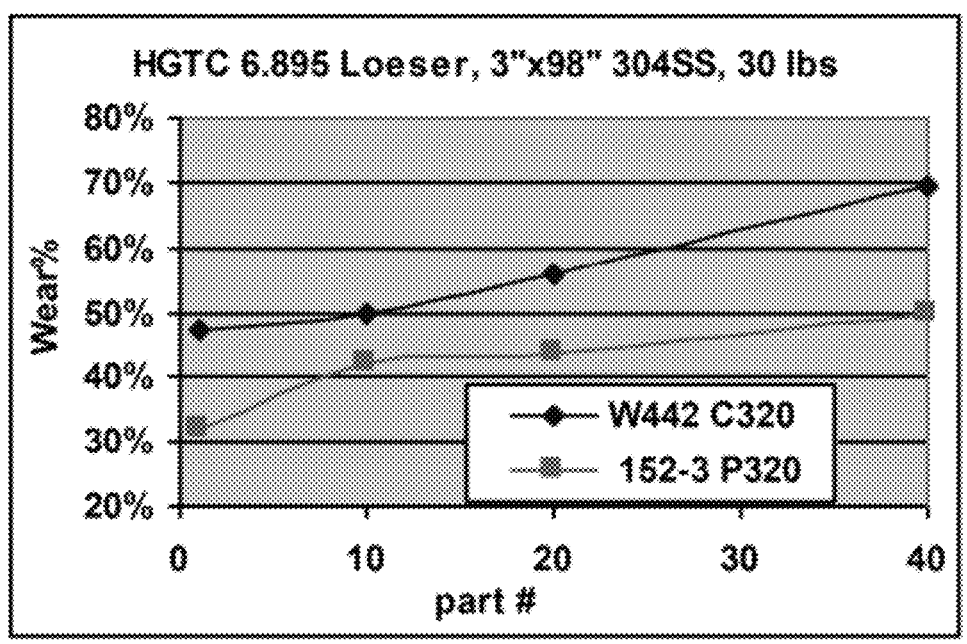
FIG. 8B includes a plot of wear versus part for an exemplary sample formed according to an embodiment and a conventional sample.

FIG. 8B includes a plot of wear versus part for the exemplary sample and conventional sample. As illustrated, the exemplary sample had significantly less wear versus the conventional sample for each of the parts tested. Moreover, the total wear of the exemplary sample was significantly less after completing the test as compared to the conventional sample.

Example 8

A coated abrasive article is formed using the composite particles of Example 3. A make coat comprising phenol formaldehyde resin material, commercially available from Schenectady International Corporation is coated by a two-roll direct process onto a backing of polyester commercially available from Milliken Textured Yarns. The composite abrasive particles of Sample 2 are placed on the make coat using a gravity coating procedure. The make coat is cured in an oven at 180° F. to 240° F. for 1.5 hours. Finally, a size coat is deposited on the abrasive particles and the make coat. The size coat is a phenol formaldehyde resin material commercially available as HRJ15993 from Schenectady International Corporation.

A comparative grinding test was conducted between the exemplary coated abrasive of Example 8 (i.e., exemplary sample) and a conventional coated abrasive product containing cork particles, designated 464 and commercially available from 3M, which is illustrated in FIG. 6. The grinding test is a wet centerless grinding test using belt sizes of 3 inches by 98 inches, on a Loeser Grinding Machine, under an applied force of 30 lbs. The workpiece is 304 stainless steel. The test includes grinding of 40 parts and a measure of the material removal rate, wear, and surface finish.

Figure 9A:
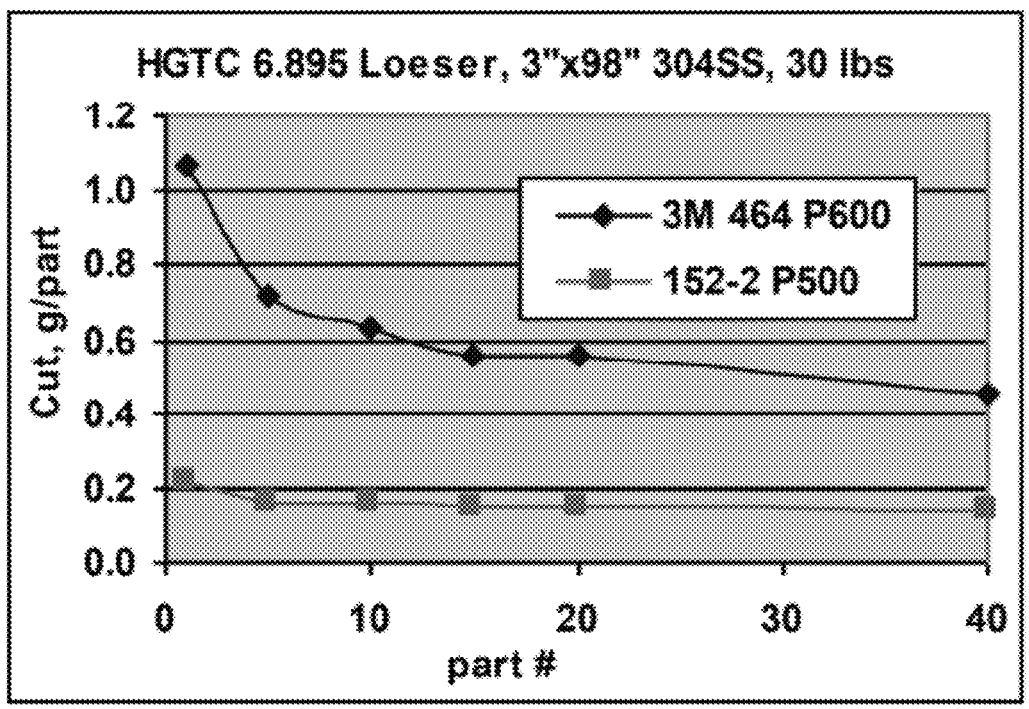
FIG. 9A includes a plot of cut (g/part) versus part for an exemplary sample formed according to an embodiment and a conventional sample.

FIG. 9A includes a plot of cut (g/part) versus part for the exemplary sample and conventional sample. As illustrated, the exemplary sample made according to an embodiment demonstrates significantly greater consistency in cut. Notably, the cut per part is maintained throughout the grinding operation for the exemplary sample. By comparison, the conventional sample demonstrated significantly greater variation in the effective cut between different parts, notably experiencing a significant decrease in the cut rate after only a few operations.

Figure 9B:
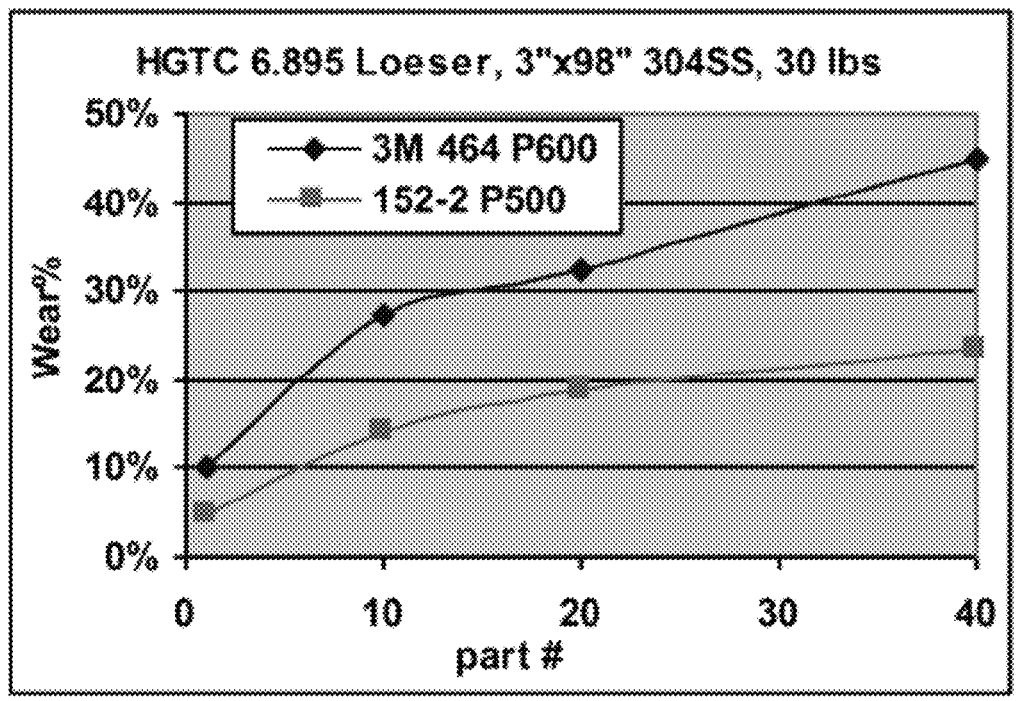
FIG. 9B includes a plot of wear versus part for an exemplary sample formed according to an embodiment and a conventional sample.

FIG. 9B includes a plot of wear versus part for the exemplary sample and conventional sample. As illustrated, the exemplary sample demonstrated significantly less wear versus the conventional sample for each of the grinding operations. Moreover, the total wear of the exemplary sample was significantly less after completing the test as compared to the conventional sample. In fact, the total wear at the end of testing was about twice as great for the 3M abrasive as compared to the exemplary abrasive.

The foregoing addresses composite abrasive particles and coated abrasive articles utilizing such abrasive particles, which represents a departure from the state-of-the-art. Notably, the process of forming the abrasive particles is completed in a particular manner, having particular controlled variables and ratios to facilitate the formation of composite abrasive particles having particular features. For example, the process for forming the abrasive particles includes a combination of processing features, including weight percents of additives, ratio of additives, binder materials, abrasive grain materials, abrasive grain sizes, cork sizes, and curing procedures that facilitate the formation of the composite abrasive particles. The composite abrasive particles have a combination of features, including for example, a core/shell construction, materials of the core, size of the core particle, a shell layer having multiple components including an intermediate layer and an overlying layer of abrasive grains, thickness of the intermediate layer, ratios of the thickness of the intermediate layer relative to the size of the core and abrasive grains, abrasive grains of particular loose packed density, and other such features, which facilitate the formation of new abrasive grains having performance characteristics that are equal to or greater than the performance characteristics of conventional abrasive articles.

In the foregoing, reference to specific embodiments and the connections of certain components is illustrative. It will be appreciated that reference to components as being coupled or connected is intended to disclose either direct connection between said components or indirect connection through one or more intervening components, as will be appreciated, to carry out the methods as discussed herein. As such, the above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The disclosure is submitted with the understanding that it will not be used to interpret or limit the scope or meaning of the claims. In addition, in the foregoing disclosure, various features may be grouped together or described in a single embodiment for the purpose of streamlining the disclosure. This disclosure is not to be interpreted as reflecting an intention that the embodiments herein limit the features provided in the claims, and moreover, any of the features described herein can be combined together to describe the inventive subject matter. Still, inventive subject matter may be directed to less than all features of any of the disclosed embodiments.

What is claimed is:

1. An abrasive article comprising:
   an abrasive particle including:
      a core comprising a compressible material;
      an intermediate layer comprising a binder material overlying an exterior surface of the core; and
      an outer layer comprising abrasive grains overlying the intermediate layer,
      wherein the outer layer comprises an average thickness of not greater than about 25 times the average thickness of the abrasive grains and at least about 1.5 times an average thickness of the abrasive grains.

2. The abrasive article of claim 1, wherein the core comprises at least about 75 vol % compressible material.

3. The abrasive article of claim 1, wherein the core consists essentially of cork.

4. The abrasive article of claim 1, wherein the core comprises an average particle size of at least about 0.01 mm and not greater about 10 mm.

5. The abrasive article of claim 1, wherein the abrasive grains comprise a material selected from the group consisting of silica, alumina, zirconia, silicon carbide, silicon nitride, boron nitride, alumina nitride, cofused alumina zirconia, ceria, titanium diboride, boron carbide, garnet, diamond, flint, emery, and a blend thereof.

6. The abrasive article of claim 1, wherein the outer layer is bonded directly to the intermediate layer.

7. The abrasive article of claim 1, wherein a majority of the outer layer defines a single layer of abrasive grains bonded to the intermediate layer.

8. The abrasive article of claim 1, wherein the intermediate layer is bonded directly to the exterior surface of the core and has an average thickness of not greater than about 20% of an average particle size of the core.

9. The abrasive article of claim 1, wherein the intermediate layer has an average thickness not greater than about 80% and at least about 0.01% of the average particle size of the abrasive grains.

10. An abrasive article comprising:
   a composite abrasive particle including a core and a shell layer overlying the core, wherein the core comprises a compressible material and the shell layer comprises an intermediate layer overlying the core and an outer layer overlying the intermediate layer; and
   wherein the abrasive particle comprises a shell layer ratio (Wi:Wo) of at least about 1:1, wherein Wi is the weight percent of the intermediate layer for the entire weight of the abrasive particle and Wo is the weight percent of the outer layer for the entire weight of the abrasive particle.

11. The abrasive article of claim 10, wherein the shell layer ratio (Wi:Wo) is at least about 1:1.5.

12. The abrasive article of claim 10, wherein the shell layer ratio (Wi:Wo) is not greater than 1:10.

13. The abrasive article of claim 10, wherein the abrasive particle comprises an abrasive grain:core ratio (Wag:Wc) of at least about 2:1, wherein Wag is the weight percent of the abrasive grains for the entire weight of the abrasive particle and Wc is the weight percent of the core for the entire weight of the abrasive particle.

14. The abrasive article of claim 10, wherein the abrasive grain:core ratio (Wag:Wc) is not greater than about 40:1.

15. An abrasive article comprising:
   a coated abrasive article including:
      a backing; and a composite abrasive particle bonded to the backing, wherein the composite abrasive particle includes a core comprising cork, an intermediate layer comprising a binder material overlying an exterior surface of the core, an outer layer comprising abrasive grains overlying the intermediate layer.

16. The abrasive article of claim 15, wherein the composite abrasive particle is bonded to the make coat.

17. The abrasive article of claim 15, wherein the make coat comprises wollastonite.

18. The abrasive article of claim 15, further comprising a size coat overlying the composite abrasive particle and the backing.

19. The abrasive article of claim 18, wherein the size coat overlies a make coat and comprises calcium carbonate.

20. The abrasive article of claim 1, wherein the intermediate layer comprises a material selected from the group consisting of phenolic resin, urea formaldehyde, urethanes, epoxies, polyimides, polyamides, polyester, acrylates, polyvinyls, protein-based materials, starch-based materials, and a combination thereof.

* * * * *